US010235528B2

(12) United States Patent
Diu (10) Patent No.: US 10,235,528 B2
(45) Date of Patent: Mar. 19, 2019

(54) AUTOMATED DETERMINATION OF VULNERABILITY IMPORTANCE

(71) Applicant: International Business Machines Corporation, Armonk, NY (US)

(72) Inventor: Wayne Diu, Rockcliffe Park (CA)

(73) Assignee: International Business Machines Corporation, Armonk, NY (US)

( * ) Notice: Subject to any disclaimer, the term of this patent is extended or adjusted under 35 U.S.C. 154(b) by 111 days.

(21) Appl. No.: 15/346,890

(22) Filed: Nov. 9, 2016

(65) Prior Publication Data

US 2018/0129811 A1 May 10, 2018

(51) Int. Cl.
G06F 21/00 (2013.01)
G06F 21/57 (2013.01)

(52) U.S. Cl.
CPC ...... G06F 21/577 (2013.01); *G06F 2221/033* (2013.01)

(58) Field of Classification Search
CPC .................................................. G06F 21/577
USPC ......................................................... 726/25
See application file for complete search history.

(56) References Cited

U.S. PATENT DOCUMENTS

| 9,003,537 | B2 | 4/2015 | Raz et al. | |
| 9,413,780 | B1* | 8/2016 | Kaplan | H04L 63/1433 |
| 2002/0104014 | A1* | 8/2002 | Zobel | G06F 21/577 726/26 |
| 2004/0064726 | A1* | 4/2004 | Girouard | G06F 21/577 726/25 |
| 2005/0138413 | A1* | 6/2005 | Lippmann | G06F 21/577 726/4 |
| 2005/0283834 | A1* | 12/2005 | Hall | G06F 21/577 726/24 |
| 2007/0061874 | A1* | 3/2007 | Coppola | H04L 63/14 726/10 |

(Continued)

FOREIGN PATENT DOCUMENTS

WO    WO 2013/109374 A1    7/2013

OTHER PUBLICATIONS

"Common Vulnerability Scoring System, V3 Development Update", FIRST.org, Inc., https://www.first.org/cvss, Jun. 10, 2015, 12 pages.

*Primary Examiner* — Harris C Wang
(74) *Attorney, Agent, or Firm* — Francis Lammes; Stephen J. Walder, Jr.; Jeffrey S. LaBaw (57) ABSTRACT

A mechanism is provided for automatically determining an importance of vulnerabilities identified in an application. An identified application is scanned for a set of vulnerabilities with uncertain importance. For each vulnerability with uncertain importance in the set of vulnerabilities with uncertain importance, a set of characteristics is identified, a level of importance for the vulnerability with uncertain importance is determined utilizing the set of characteristics, and the level of importance is assigned to the vulnerability with uncertain importance thereby forming an identified vulnerability. With a respective level of importance assigned to each vulnerability with uncertain importance in the set of vulnerabilities with uncertain importance thereby forming a set of vulnerabilities with identified importance, the set of vulnerabilities with identified importance are presented to a user so that the set of vulnerabilities with identified importance may be addressed by the user based on the respective level of importance.

18 Claims, 3 Drawing Sheets

(56) References Cited

U.S. PATENT DOCUMENTS

| | | | |
|---|---|---|---|
| 2007/0067848 A1* | 3/2007 | Gustave | G06F 21/577 726/25 |
| 2007/0094735 A1 | 4/2007 | Cohen | |
| 2008/0201780 A1* | 8/2008 | Khan | G06F 21/577 726/25 |
| 2009/0077666 A1* | 3/2009 | Chen | G06F 21/577 726/25 |
| 2011/0219454 A1* | 9/2011 | Lee | G06F 17/30 726/25 |
| 2012/0304300 A1* | 11/2012 | Labumbard | G06F 21/577 726/25 |
| 2013/0067572 A1* | 3/2013 | Muramoto | H04L 63/1408 726/22 |
| 2013/0191919 A1* | 7/2013 | Basavapatna | G06F 21/577 726/25 |
| 2013/0247206 A1 | 9/2013 | Hugard, IV et al. | |
| 2014/0075560 A1 | 3/2014 | Guy et al. | |
| 2014/0189868 A1* | 7/2014 | Laniepce | G06F 21/552 726/23 |
| 2015/0106939 A1* | 4/2015 | Lietz | H04L 63/1433 726/25 |
| 2015/0172308 A1* | 6/2015 | Borohovski | H04L 63/1433 726/25 |
| 2015/0237063 A1* | 8/2015 | Cotton | H04L 63/1433 726/25 |
| 2015/0237065 A1* | 8/2015 | Roytman | H04L 63/1433 726/25 |
| 2015/0242634 A1* | 8/2015 | Lietz | G06F 21/577 726/25 |
| 2016/0098563 A1* | 4/2016 | Sharma | G06F 21/577 726/25 |

\* cited by examiner

AUTOMATED DETERMINATION OF VULNERABILITY IMPORTANCE

BACKGROUND

The present application relates generally to an improved data processing apparatus and method and more specifically to mechanisms for automatically determining an importance of vulnerabilities identified in an application.

An application vulnerability is a system flaw or weakness in an application that could be exploited to compromise the security of the application. Many organizations use applications to run critical business processes, conduct transactions with suppliers and deliver sophisticated services to customers. Interestingly, while organizations depend on such applications to run their businesses, many invest little to no effort ensuring that the applications are adequately secure. While these organizations understand established security technologies for routine tasks such as networking and operations, and for managing security procedures such as access control and authentication, many struggle with implementing, managing, and maintaining effective application security programs. Since applications can compromise overall security across the entire organization, securing the applications needs to become a top priority.

The ramifications of under-secured applications may be dire. Vulnerabilities inadvertently introduced during development may give hackers the ability to destabilize applications and obtain unfettered access to confidential company information or private customer data. This type of data loss may lead to a damaged brand reputation, loss of consumer confidence, disruption of business operations, interruption of the supply chain, threat of legal action, and/or regulatory censure—all consequences that can ultimately impact profitability.

SUMMARY

This Summary is provided to introduce a selection of concepts in a simplified form that are further described herein in the Detailed Description. This Summary is not intended to identify key factors or essential features of the claimed subject matter, nor is it intended to be used to limit the scope of the claimed subject matter.

In one illustrative embodiment, a method, in a data processing system, is provided for automatically determining an importance of vulnerabilities identified in an application. The illustrative embodiment scans an identified application for a set of vulnerabilities with uncertain importance. In the illustrative embodiment, each vulnerability with uncertain importance in the set of vulnerabilities with uncertain importance fails to have an associated importance. For each vulnerability with uncertain importance in the set of vulnerabilities with uncertain importance, the illustrative embodiment identifies a set of characteristics, utilizes the set of characteristics associated with the vulnerability with uncertain importance to determine a level of importance for the vulnerability with uncertain importance, and assigns the level of importance to the vulnerability with uncertain importance thereby forming an identified vulnerability. With a respective level of importance assigned to each vulnerability with uncertain importance in the set of vulnerabilities with uncertain importance thereby forming a set of vulnerabilities with identified importance, the illustrative embodiment the set of vulnerabilities with identified importance to a user so that the set of vulnerabilities with identified importance may be addressed by the user based on the respective level of importance.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Again, the ramifications of under-secured applications may be dire. Vulnerabilities inadvertently introduced during development may give hackers the ability to destabilize applications and obtain unfettered access to confidential company information or private customer data. Addressing application security may be quite challenging. Determining which vulnerability to address first is an important part of the process, due to resources being limited. Thus, solving higher priority vulnerabilities first is of utmost importance.

While some security scanning applications provide for determining which vulnerabilities are of higher importance using metrics such as problem severity (based on certain individual vulnerability's characteristics) or the industry standard Common Vulnerability Scoring System (CVSS) metric (also based on certain individual vulnerability's characteristics), one limitation of such metrics is that a predefined set of the individual vulnerability's characteristics must be known. When thousands of vulnerabilities are found without the individual vulnerability's characteristics being known, manually setting the individual vulnerability's characteristics for each vulnerability is a time consuming task.

Therefore, the illustrative embodiments provide mechanisms for automatically determining an importance of vulnerabilities identified in an application. For a set of vulnerabilities with uncertain importance identified for a particular application thereby forming a set of vulnerabilities with uncertain importance, the vulnerability importance identification mechanisms identify a set of characteristics for each vulnerability with uncertain importance, such as a location of the identified vulnerability with uncertain importance within source code of the application (including the file name and line number(s)), a host name where the application resides, a domain name associated with the application, a pathname to the application, or the like. The importance of the vulnerability with uncertain importance based on the identified set of characteristics may then be determined in any number of ways. For example, in one embodiment, the set of characteristics associated with the vulnerability with uncertain importance may be compared to characteristics of other vulnerabilities that have an identified importance. If the set of characteristics associated with the vulnerability with uncertain importance are above or equal to a predetermined similarity threshold of characteristics associated with a vulnerability with an identified importance, then the vulnerability importance identification mechanisms may utilize the actual importance associated with the vulnerability with an identified importance for the vulnerability with uncertain importance. The importance could be derived from 1) CVSS metrics (which includes "Access Complexity," "Authentication," "Confidentiality Impact," "Integrity Impact," "Availability Impact," "Exploitability," "Remediation Level," and "Report Confidence," each of which has an associated value), 2) manually specified for the vulnerability, or 3) derived from a formula other than CVSS.

In another embodiment, the vulnerability importance identification mechanisms may present the set of vulnerabilities with uncertain importance to a user as a sorted list. The list may be sorted based on the identified set of characteristics with, for example, those vulnerabilities with uncertain importance having more similar identified characteristics (such as the same filename and a line number in the proximity of another vulnerability with a specified set of characteristics) more prevalent in the list and those vulnerabilities with uncertain importance having fewer similar identified characteristics less prevalent, those vulnerabilities with uncertain importance having fewer similar identified characteristics more prevalent in the list and those vulnerabilities with uncertain importance having more similar identified characteristics less prevalent, or in some other sorted reference based on a set of user preferences. Utilizing the sorted list, the user may manually set, for each property of the vulnerability (such as CVSS metrics), an associated value. In addition, the user may manually set the importance of the vulnerability itself. Then utilizing the values associated with the properties that affect the importance of the vulnerability (such as CVSS metrics), the importance of the vulnerability where the user has manually set the properties becomes known and the vulnerability importance identification mechanisms determine an importance for the vulnerabilities with uncertain importance having similar characteristics (characteristics being the set of characteristics that are used to determine whether vulnerabilities are similar), including possibly updating the importance of vulnerabilities for which importances may previously have automatically been assigned. (For example, for 3 vulnerabilities, A, B, and C, A is found at line 5 of A.java in function A, B is found at line 10 of B.java in function B, and C is found at line 25 of C.java in function B. Initially, A's importance is set to Critical, so B and C are also automatically assigned Critical importance by the vulnerability importance identification mechanism. If a user adjusts the properties such that vulnerability C is set to Low importance, vulnerability B will be adjusted by the vulnerability importance identification mechanism also to Low importance, even though the importance identification mechanism previously identified it as Critical, because the set of characteristics matches it closer to vulnerability C than A).

In yet another embodiment, a mix of automated and manual methods may be used to establish an importance for each vulnerability with uncertain importance. That is, the automated portion may operate as previously described for the set of vulnerabilities with uncertain importance that are above or equal to the predetermined similarity threshold. Then, for each vulnerability with uncertain importance that is below the predetermined similarity threshold for matching a vulnerability with an identified importance, the vulnerability importance identification mechanisms present the user a sorted list of remaining vulnerabilities with uncertain importance, sorted in one of the previously described manners, that need to have manual intervention to determine their importance.

Once the set of metric values have been determined for each of the set of vulnerabilities with uncertain importance, the vulnerability importance identification mechanisms operate to assign a level of importance, such as critical, high, medium, low, or the like, to each vulnerability with uncertain importance based on the values associated with each metric using a set of predetermined thresholds. For example, if the value of a predetermined number of metrics associated with the vulnerability with uncertain importance is above a predetermined threshold of defined characteristics of a vulnerability of critical importance, then the vulnerability importance identification mechanisms assigns a critical importance to the vulnerability with uncertain importance. As another example, if the value of a predetermined number of metrics associated with the vulnerability with uncertain importance is below the predetermined threshold of defined characteristics of a vulnerability of critical importance but above a predetermined threshold of defined characteristics of a vulnerability of high importance, then the vulnerability importance identification mechanisms assigns a high importance to the vulnerability with uncertain importance.

This process may be repeated for each vulnerability with uncertain importance. Once each of the set of vulnerabilities with uncertain importance has an assigned importance thereby forming a set of vulnerabilities with identified importance, the vulnerability importance identification mechanisms present the set of vulnerabilities with identified importance to the user so that the set of vulnerabilities with identified importance may be addressed by the user based on their identified importance. By presenting the set of vulnerabilities with identified importance to the user so that the set of vulnerabilities with identified importance are addressed based on their identified importance, the vulnerability importance identification mechanisms improve the security of the application. That is, by the user addressing the set of vulnerabilities with identified importance associated with the application in the above manner, the user will be able to address those identified vulnerabilities in order of importance without first having to manually determine the importance of all vulnerabilities (or even manually specifying the characteristics that are used to determine the vulnerabilities' importance for all vulnerabilities) before addressing the vulnerabilities of greatest identified importance, which saves time, provides better accuracy, and, as mentioned previously, improves the security of the application.

Before beginning the discussion of the various aspects of the illustrative embodiments, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on general purpose hardware, software instructions stored on a medium such that the instructions are readily executable by specialized or general purpose hardware, a procedure or method for executing the functions, or a combination of any of the above.

The present description and claims may make use of the terms "a", "at least one of", and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

Moreover, it should be appreciated that the use of the term "engine," if used herein with regard to describing embodiments and features of the invention, is not intended to be limiting of any particular implementation for accomplishing and/or performing the actions, steps, processes, etc., attributable to and/or performed by the engine. An engine may be, but is not limited to, software, hardware and/or firmware or any combination thereof that performs the specified functions including, but not limited to, any use of a general and/or specialized processor in combination with appropriate software loaded or stored in a machine readable memory and executed by the processor. Further, any name associated with a particular engine is, unless otherwise specified, for purposes of convenience of reference and not intended to be limiting to a specific implementation. Additionally, any functionality attributed to an engine may be equally performed by multiple engines, incorporated into and/or combined with the functionality of another engine of the same or different type, or distributed across one or more engines of various configurations.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

Figure 1:
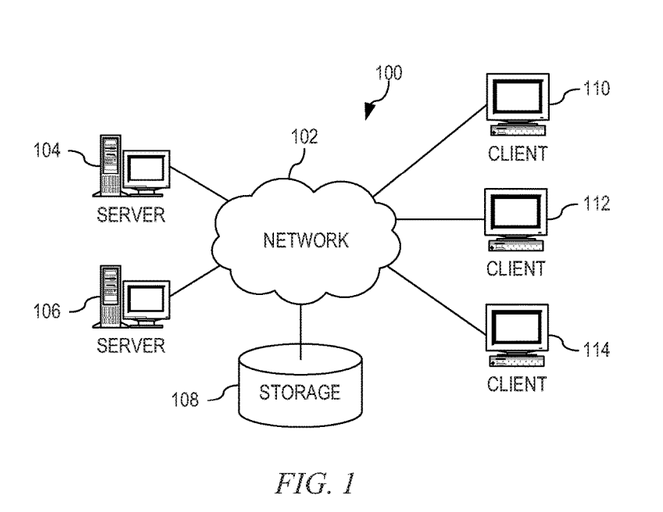
FIG. 1 is an example diagram of a distributed data processing system in which aspects of the illustrative embodiments may be implemented.
Figure 2:
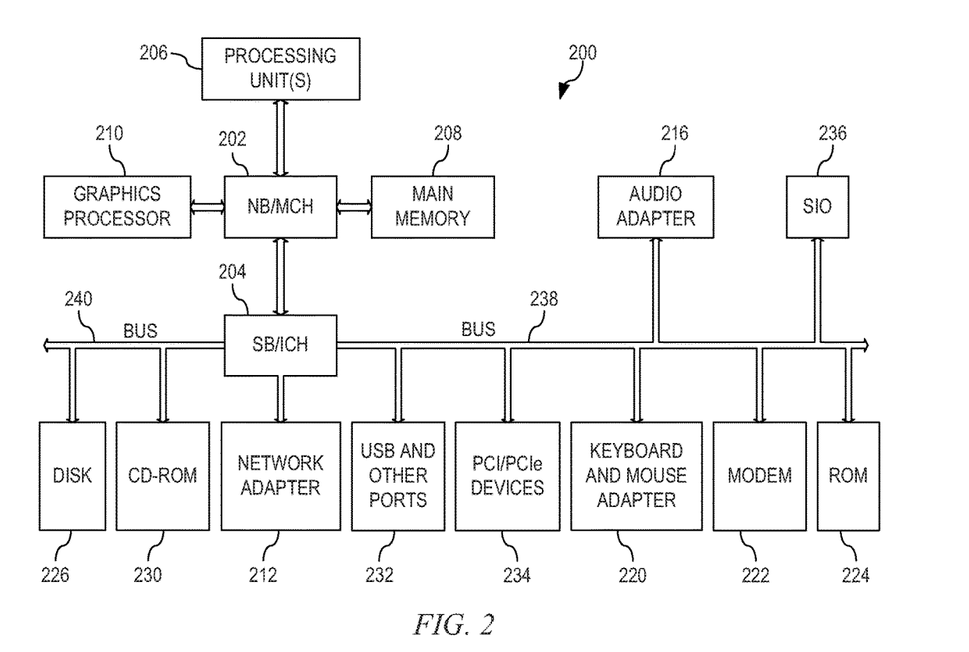
FIG. 2 is an example block diagram of a computing device in which aspects of the illustrative embodiments may be implemented.

Thus, the illustrative embodiments may be utilized in many different types of data processing environments. In order to provide a context for the description of the specific elements and functionality of the illustrative embodiments, FIGS. 1 and 2 are provided hereafter as example environments in which aspects of the illustrative embodiments may be implemented. It should be appreciated that FIGS. 1 and 2 are only examples and are not intended to assert or imply any limitation with regard to the environments in which aspects or embodiments of the present invention may be implemented. Many modifications to the depicted environments may be made without departing from the spirit and scope of the present invention.

FIG. 1 depicts a pictorial representation of an example distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

As shown in FIG. 1, one or more of the computing devices, e.g., server 104, may be specifically configured to implement vulnerability importance identification mechanisms that automatically determine an importance of vulnerabilities identified in an application. The configuring of the computing device may comprise the providing of application specific hardware, firmware, or the like to facilitate the performance of the operations and generation of the outputs described herein with regard to the illustrative embodiments. The configuring of the computing device may also, or alternatively, comprise the providing of software applications stored in one or more storage devices and loaded into memory of a computing device, such as server 104, for causing one or more hardware processors of the computing device to execute the software applications that configure the processors to perform the operations and generate the outputs described herein with regard to the illustrative embodiments. Moreover, any combination of application specific hardware, firmware, software applications executed on hardware, or the like, may be used without departing from the spirit and scope of the illustrative embodiments.

It should be appreciated that once the computing device is configured in one of these ways, the computing device becomes a specialized computing device specifically configured to implement the mechanisms of the illustrative embodiments and is not a general purpose computing device. Moreover, as described hereafter, the implementation of the mechanisms of the illustrative embodiments improves the functionality of the computing device and provides a useful and concrete result that facilitates automatically determining an importance of vulnerabilities identified in an application.

As noted above, the mechanisms of the illustrative embodiments utilize specifically configured computing devices, or data processing systems, to perform the operations for automatically determining an importance of vulnerabilities identified in an application. These computing devices, or data processing systems, may comprise various hardware elements which are specifically configured, either through hardware configuration, software configuration, or a combination of hardware and software configuration, to implement one or more of the systems/subsystems described herein. FIG. 2 is a block diagram of just one example data processing system in which aspects of the illustrative embodiments may be implemented. Data processing system 200 is an example of a computer, such as server 104 in FIG. 1, in which computer usable code or instructions implementing the processes and aspects of the illustrative embodiments of the present invention may be located and/or executed so as to achieve the operation, output, and external effects of the illustrative embodiments as described herein.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows 7®. An object-oriented programming system, such as the Java™ programming system, may run in conjunction with the operating system and provides calls to the operating system from Java™ programs or applications executing on data processing system 200.

As a server, data processing system 200 may be, for example, an IBM eServer™ System P® computer system, Power™ processor based computer system, or the like, running the Advanced Interactive Executive (AIX®) operating system or the LINUX® operating system. Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

As mentioned above, in some illustrative embodiments the mechanisms of the illustrative embodiments may be implemented as application specific hardware, firmware, or the like, application software stored in a storage device, such as HDD 226 and loaded into memory, such as main memory 208, for executed by one or more hardware processors, such as processing unit 206, or the like. As such, the computing device shown in FIG. 2 becomes specifically configured to implement the mechanisms of the illustrative embodiments and specifically configured to perform the operations and generate the outputs described hereafter with regard to automatically determining an importance of vulnerabilities identified in an application.

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

Figure 3:
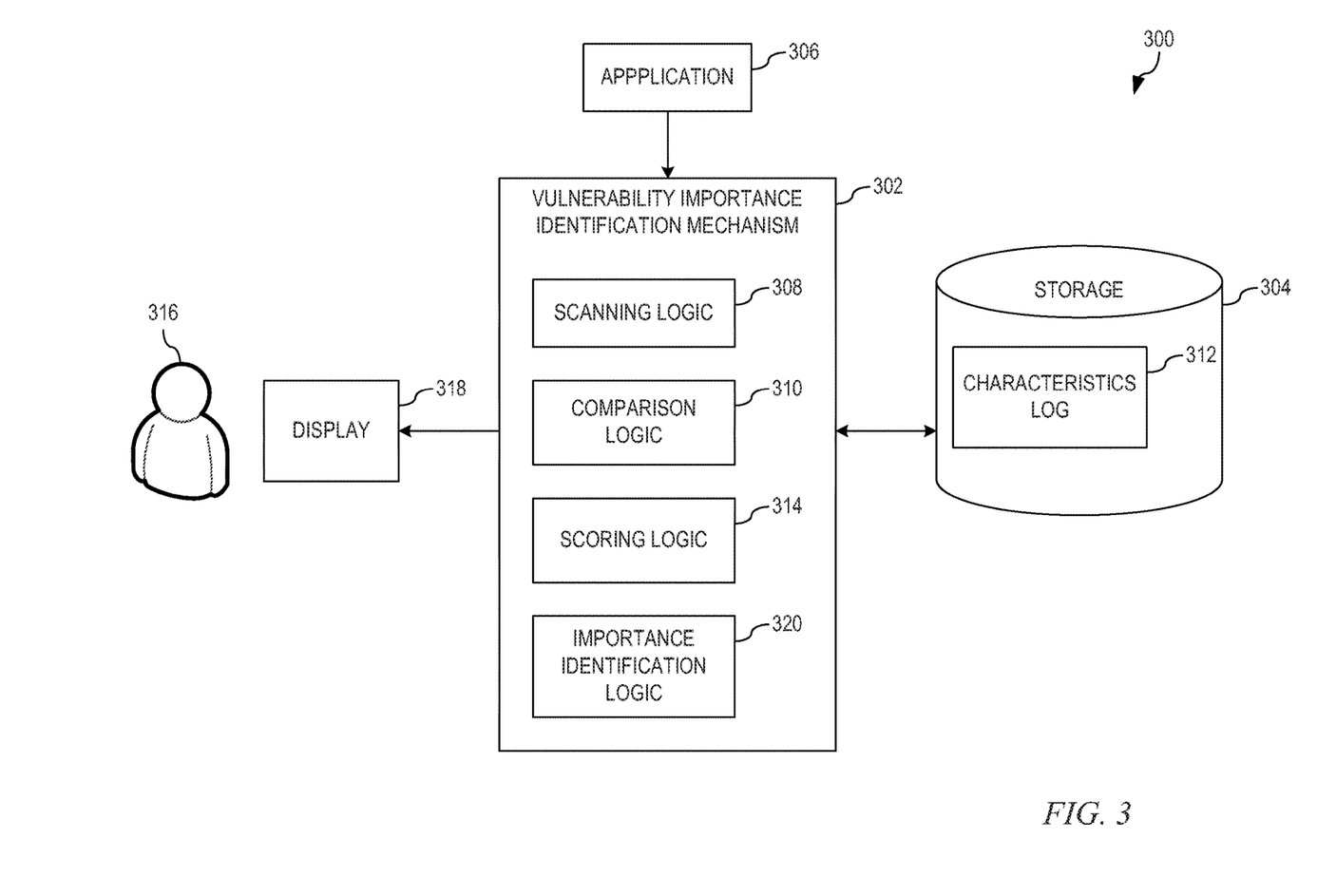
FIG. 3 depicts a functional block diagram of a vulnerability importance identification mechanism that automatically determines an importance of vulnerabilities identified in an application in accordance with an illustrative embodiment.

FIG. 3 depicts a functional block diagram of a vulnerability importance identification mechanism that automatically determines an importance of vulnerabilities identified in an application in accordance with an illustrative embodiment. Data processing system 300 comprises vulnerability importance identification mechanism 302 and storage 304. Upon receiving an identification of application 306 that is to be scanned for vulnerabilities, scanning logic 308 within vulnerability importance identification mechanism 302 scans the application for a set of vulnerabilities with uncertain importance, i.e. vulnerabilities that do not have an identified importance. Each time scanning logic 308 detects a vulnerability with uncertain importance, scanning logic 308 identifies a set of characteristics, such as a location of the vulnerability with uncertain importance within source code of application 306 (including the file name and line number(s)), a host name where the application resides, a domain name associated with the application, a pathname to the application, or the like.

In one embodiment, for each vulnerability with uncertain importance of the set of vulnerabilities with uncertain importance identified by scanning logic 308, comparison logic 310 compares the identified set of characteristics for the vulnerability with uncertain importance to characteristics log 312 that stores characteristics of other vulnerabilities that have an associated identified importance. If the set of characteristics associated with the vulnerability with uncertain importance are above or equal to a predetermined similarity threshold of characteristics associated with a vulnerability with an identified importance, then comparison logic 310 outputs a log identifier of the vulnerability with an identified importance to scoring logic 314. Scoring logic 314 utilizes the actual importance, which may be derived from: a set of Common Vulnerability Scoring System (CVSS) metrics that include "Access Complexity," "Authentication," "Confidentiality Impact," "Integrity Impact," "Availability Impact," "Exploitability," "Remediation Level," and "Report Confidence," each of which has an associated value; manually specified for the vulnerability; or derived from a formula other than CVSS. Thus, with the identification of the log identifier of the vulnerability with an identified importance, Scoring logic 314 utilizes the actual importance associated with the vulnerability with an identified importance for the vulnerability with uncertain importance.

In another embodiment, scanning logic 308 outputs the set of vulnerabilities with uncertain importance to user 316 via, in one example, display 318. In outputting the set of vulnerabilities with uncertain importance, scanning logic 308 sorts the set of vulnerabilities with uncertain importance based on the identified set of characteristics associated with each vulnerability with uncertain importance. The sorted set of vulnerabilities with uncertain importance may be sorted by, for example: those vulnerabilities with uncertain importance having more similar identified characteristics (such as the same filename and a line number in the proximity of another vulnerability with a specified set of characteristics) more prevalent in the list and those vulnerabilities with uncertain importance having fewer similar identified characteristics less prevalent, those vulnerabilities with uncertain importance having fewer similar identified characteristics more prevalent in the list and those vulnerabilities with uncertain importance having more similar identified characteristics less prevalent, or in some other sorted reference based on a set of user preferences. Utilizing the sorted list, user 316 manually sets, for each property of the vulnerability (such as CVSS metrics), an associated value, which are taken as manually set values by scoring logic 314. In addition, user 316 may manually set the importance of the vulnerability itself.

In yet another embodiment, a mix of automated scoring provided by scoring logic 314 and manual scoring provided by user 316 may be used to provide a final score for each vulnerability with uncertain importance. That is, scoring logic 314 may operate as previously described for those vulnerabilities with uncertain importance having characteristics that are above or equal to the predetermined similarity threshold of characteristics associated with a vulnerability with an identified importance. Then, for each vulnerability with uncertain importance that is below the predetermined similarity threshold for matching a vulnerability with an identified importance, comparison logic 310 may output a remaining portion of the set of vulnerabilities with uncertain importance, sorted in a manner as described previously. Utilizing the sorted list, user 316 would then manually set for each remaining vulnerability with uncertain importance and, for each property of the vulnerability, an associated value, which are taken as manually set values by scoring logic 314.

Once the set of metric values have been determined for each of the set of vulnerabilities with uncertain importance, importance identification logic 320 operates to assign a level of importance, such as critical, high, medium, low, or the like, to each uncertain vulnerability based on the values associated with each metric using a set of predetermined thresholds. For example, if the value of a predetermined number of metrics associated with the vulnerability with uncertain importance is above or equal to a predetermined threshold of defined characteristics of a vulnerability of critical importance, then importance identification logic 320 assigns a critical importance to the uncertain vulnerability. As another example, if the value of a predetermined number of metrics associated with the vulnerability with uncertain importance is below the predetermined threshold of defined characteristics of a vulnerability of critical importance but above a predetermined threshold of defined characteristics of a vulnerability of high importance, then importance identification logic 320 assigns a high importance to the vulnerability with uncertain importance.

Vulnerability importance identification mechanism 302 repeats the process for each vulnerability with uncertain importance in the set of vulnerabilities with uncertain importance. Once each of the set of vulnerabilities with uncertain importance has an assigned importance thereby forming a set of vulnerabilities with identified importance, vulnerability importance identification mechanism 302 presents the set of vulnerabilities with identified importance to user 316 so that the set of vulnerabilities with identified importance may be addressed by user 316 based on their identified importance. By presenting the set of vulnerabilities with identified importance to user 316, user 316 addresses the set of vulnerabilities with identified importance based on the importance identified by vulnerability importance identification mechanism 302 thereby saving time, providing better accuracy, and improving the security of application 306.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Figure 4:
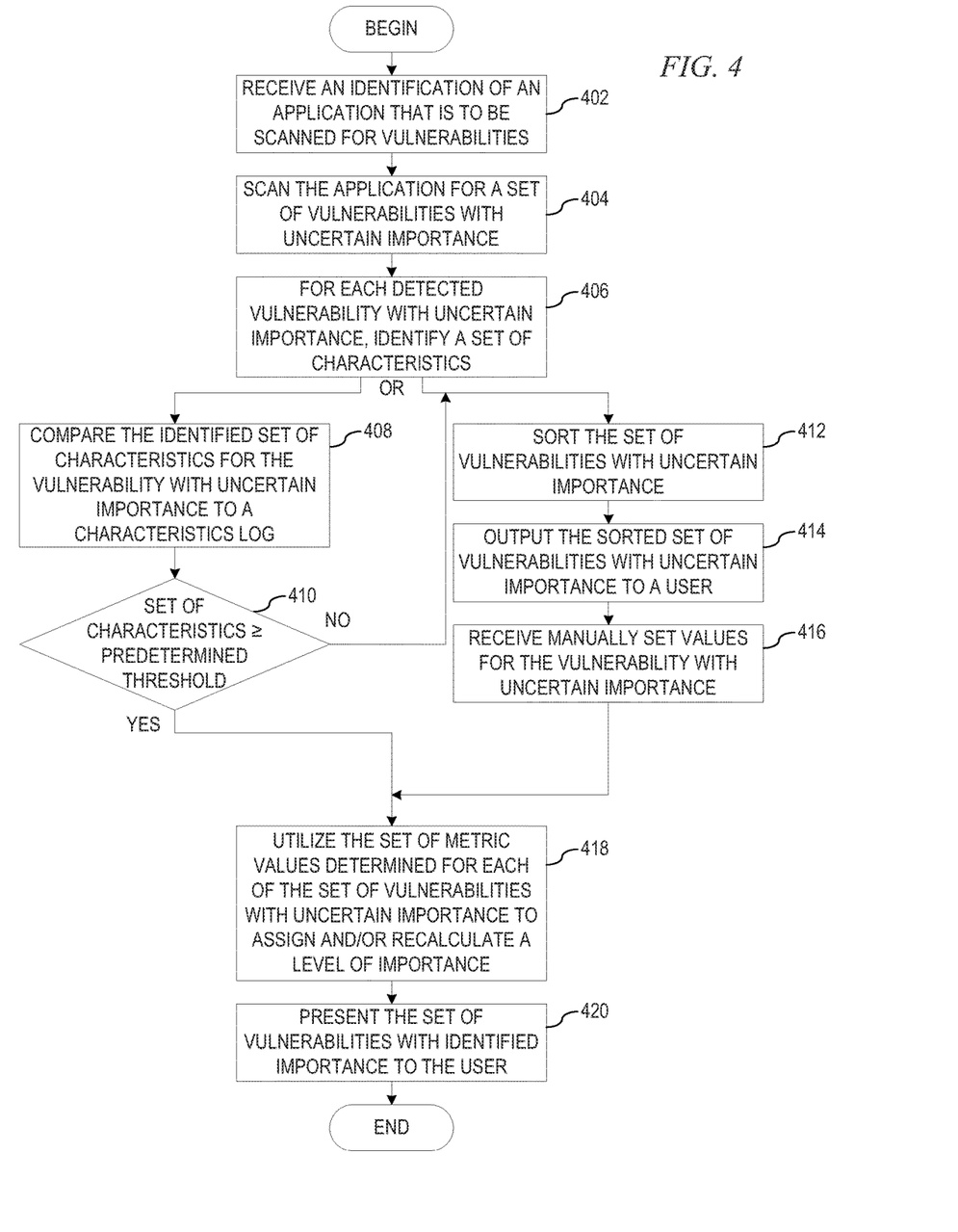
FIG. 4 is a flowchart of the operation performed by a vulnerability importance identification mechanism in automatically determining an importance of vulnerabilities identified in an application in accordance with an illustrative embodiment.

FIG. 4 is a flowchart of the operation performed by a vulnerability importance identification mechanism in automatically determining an importance of vulnerabilities identified in an application in accordance with an illustrative embodiment. As the operation begins, the vulnerability importance identification mechanism receives an identification of an application that is to be scanned for vulnerabilities (step 402). The vulnerability importance identification mechanism scans the application for a set of vulnerabilities with uncertain importance, i.e. vulnerabilities that do not have an identified importance (step 404). For each detected vulnerability with uncertain importance, the vulnerability importance identification mechanism identifies a set of characteristics (step 406). The set of characteristics includes a location of the vulnerability with uncertain importance within source code of the application (including the file name and line number(s)), a host name where the application resides, a domain name associated with the application, a pathname to the application, or the like.

From step 406, the operation may branch into one of two different operations based on user preferences. In a first branch, for each vulnerability with uncertain importance of the set of vulnerabilities with uncertain importance, the vulnerability importance identification mechanism compares the identified set of characteristics for the vulnerability with uncertain importance to a characteristics log, which stores characteristics of other vulnerabilities that have an associated identified importance (step 408) and determines whether the set of characteristics associated with the vulnerability with uncertain importance are above or equal to a predetermined similarity threshold of the set of characteristics associated with a vulnerability with an identified importance (step 410).

If at step 410 the set of characteristics associated with the vulnerability with uncertain importance fail to be above or equal to a predetermined similarity threshold of characteristics associated with a vulnerability with an identified importance or, in the second branch from step 406, the user preferences indicate that the metrics and associated values are to be manually provided, the vulnerability importance identification mechanism sorts the set of vulnerabilities with uncertain importance based on the identified set of characteristics associated with each vulnerability with uncertain importance (step 412). The set of vulnerabilities with uncertain importance may be sorted by, for example: those vulnerabilities with uncertain importance having more similar identified characteristics (such as the same filename and a line number in the proximity of another vulnerability with a specified set of characteristics) more prevalent in the list and those vulnerabilities with uncertain importance having fewer similar identified characteristics less prevalent, those vulnerabilities with uncertain importance having fewer similar identified characteristics more prevalent in the list and those vulnerabilities with uncertain importance having more similar identified characteristics less prevalent, or in some other sorted reference based on a set of user preferences. The vulnerability importance identification mechanism outputs the set of vulnerabilities with uncertain importance to a user (step 414). The user utilizes the sorted list and manually sets, for each property of the vulnerability (such as CVSS metrics), an associated value, which the vulnerability importance identification mechanism receives as manually set values (step 416).

If at step 410 the set of characteristics associated with the vulnerability with uncertain importance are above or equal to a predetermined similarity threshold of characteristics associated with a vulnerability with an identified importance or from step 416, the vulnerability importance identification mechanism utilizes the set of metric values have been determined for each of the set of vulnerabilities with uncertain importance to assign and/or recalculate a level of importance, such as critical, high, medium, low, or the like, to each vulnerability with uncertain importance using a set of predetermined thresholds (step 418), thereby forming a set of vulnerabilities with identified importance. For example, if the value of a predetermined number of metrics associated with the vulnerability with uncertain importance is above or equal to a predetermined threshold of defined characteristics of a vulnerability of critical importance, then the vulnerability importance identification mechanism assigns a critical importance to the vulnerability with uncertain importance. As another example, if the value of a predetermined number of metrics associated with the vulnerability with uncertain importance is below the predetermined threshold of defined characteristics of a vulnerability of critical importance but above a predetermined threshold of defined characteristics of a vulnerability of high importance, then the vulnerability importance identification mechanism assigns a high importance to the vulnerability with uncertain importance.

The vulnerability importance identification mechanism then presents the set of vulnerabilities with identified importance to the user (step 420) so that the set of vulnerabilities with identified importance may be addressed by the user based on their identified importance. By presenting the set of vulnerabilities with identified importance to the user, the user addresses the set of vulnerabilities with identified importance based on the importance identified by the vulnerability importance identification mechanism thereby saving time, providing better accuracy, and improving the security of the application. The operation ends thereafter.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Thus, the illustrative embodiments provide mechanisms for automatically determining an importance of vulnerabilities identified in an application. For a set of vulnerabilities with uncertain importance identified for a particular application, the vulnerability importance identification mechanisms identify a set of characteristics for each vulnerability, such as a location of the identified vulnerability within the source code (including the file name and line number(s)), a host name where the application resides, a domain name associated with the application, a pathname to the application, or the like. The vulnerability importance identification mechanisms determine a set of metrics and associated values for each vulnerability with uncertain importance based on the identified set of characteristics. Once the set of metric values have been determined for each of the set of vulnerabilities with uncertain importance, the vulnerability importance identification mechanisms operate to assign and/or recalculate a level of importance, such as critical, high, medium, low, or the like, to each vulnerability based on the values associated with each metric using a set of predetermined thresholds.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a communication bus, such as a system bus, for example. The memory elements can include local memory employed during actual execution of the program code, bulk storage, and cache memories which provide temporary storage of at least some program code in order to reduce the number of times code must be retrieved from bulk storage during execution. The memory may be of various types including, but not limited to, ROM, PROM, EPROM, EEPROM, DRAM, SRAM, Flash memory, solid state memory, and the like.

Input/output or I/O devices (including but not limited to keyboards, displays, pointing devices, etc.) can be coupled to the system either directly or through intervening wired or wireless I/O interfaces and/or controllers, or the like. I/O devices may take many different forms other than conventional keyboards, displays, pointing devices, and the like, such as for example communication devices coupled through wired or wireless connections including, but not limited to, smart phones, tablet computers, touch screen devices, voice recognition devices, and the like. Any known or later developed I/O device is intended to be within the scope of the illustrative embodiments.

Network adapters may also be coupled to the system to enable the data processing system to become coupled to other data processing systems or remote printers or storage devices through intervening private or public networks. Modems, cable modems and Ethernet cards are just a few of the currently available types of network adapters for wired communications. Wireless communication based network adapters may also be utilized including, but not limited to, 802.11 a/b/g/n wireless communication adapters, Bluetooth wireless adapters, and the like. Any known or later developed network adapters are intended to be within the spirit and scope of the present invention.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, in a data processing system comprising a processor and a memory coupled to the processor, the memory comprising instructions that are executed by the processor to cause the processor to be configured to implement a vulnerability importance identification mechanism for automatically determining an importance of vulnerabilities identified in an application, the method comprising:
scanning, by scanning logic in the vulnerability importance identification mechanism, an identified application for a set of vulnerabilities with uncertain importance, wherein each vulnerability with uncertain importance in the set of vulnerabilities with uncertain importance fails to have an associated importance;
for each vulnerability with uncertain importance in the set of vulnerabilities with uncertain importance:
identifying, by the scanning logic, a set of characteristics, wherein the set of characteristics includes a location of the vulnerability with uncertain importance within source code of the application (including a file name and line number(s)), a host name where the application resides, a domain name associated with the application, and a pathname to the application;
utilizing the set of characteristics associated with the vulnerability with uncertain importance, determining, by scoring logic in the vulnerability importance identification mechanism, a level of importance for the vulnerability with uncertain importance; and
assigning, by importance identification logic in the vulnerability importance identification mechanism, the level of importance to the vulnerability with uncertain importance thereby forming an identified level of importance; and
with a respective identified level of importance assigned to each vulnerability, with uncertain importance in the set of vulnerabilities with uncertain importance thereby forming a set of vulnerabilities with identified level of importance, presenting, by the vulnerability importance identification mechanism, the set of vulnerabilities with identified level of importance to a user so that the set of vulnerabilities with identified level of importance are addressed by the user based on the respective identified level of importance.

2. The method of claim 1, wherein determining the level of importance for the vulnerability with uncertain importance comprises:
for each vulnerability with uncertain importance of the set of vulnerabilities with uncertain importance:
comparing, by comparison logic in the vulnerability importance identification mechanism, the set of characteristics for the vulnerability with uncertain importance to a set of characteristics of other vulnerabilities that have an identified level of importance;
responsive to the set of characteristics associated with the vulnerability with uncertain importance being greater than or equal to a predetermined similarity threshold of the set of characteristics associated with a vulnerability with an identified level of importance, utilizing, by the scoring logic, metric levels associated with vulnerability with the identified level of importance as metric levels for the vulnerability with uncertain importance; and
determining, by the scoring logic, the level of importance for the vulnerability with uncertain importance based on the metric levels for the vulnerability with uncertain importance.

3. The method of claim 2, further comprising:
for each vulnerability with uncertain importance of the set of vulnerabilities with uncertain importance:
responsive to the set of characteristics associated with the vulnerability with uncertain importance being less than the predetermined similarity threshold of the set of characteristics associated with a vulnerability with an identified level of importance, utilizing, by the scoring logic, metric levels assigned by the user as the metric levels for the vulnerability with uncertain importance.

4. The method of claim 2, wherein the metrics include "Access Complexity," "Authentication," "Confidentiality Impact," "Integrity Impact," "Availability Impact," "Exploitability," "Remediation Level," and "Report Confidence."

5. The method of claim 1, wherein determining the level of importance for the vulnerability with uncertain importance comprises:

sorting, by the scanning logic, the set of vulnerabilities with uncertain importance based on the set of characteristics associated with each vulnerability with uncertain importance;
presenting, by the scanning logic, a sorted set of vulnerabilities with uncertain importance to the user; and
for each vulnerability with uncertain importance of the set of vulnerabilities with uncertain importance:
utilizing, by the scoring logic, metric levels assigned by the user as the metric levels for the vulnerability with uncertain importance; and
determining, by the scoring logic, the level of importance for the vulnerability with uncertain importance based on the metric levels for the vulnerability with uncertain importance.

6. The method of claim 1, wherein assigning the level of importance to the vulnerability with uncertain importance further comprises:
recalculating, by the scoring logic, the level of importance for the vulnerability with uncertain importance based on a level of importance assigned to a vulnerability with identified level of importance.

7. A computer program product comprising a computer readable storage medium having a computer readable program stored therein, wherein the computer readable program, when executed on a computing device, causes the computing device to implement a vulnerability importance identification mechanism for automatically determining an importance of vulnerabilities identified in an application, and further causes the computing device to:
scan, by scanning logic in the vulnerability importance identification mechanism, an identified application for a set of vulnerabilities with uncertain importance, wherein each vulnerability with uncertain importance in the set of vulnerabilities with uncertain importance fails to have an associated importance;
for each vulnerability with uncertain importance in the set of vulnerabilities with uncertain importance:
identify, by the scanning logic, a set of characteristics, wherein the set of characteristics includes a location of the vulnerability with uncertain importance within source code of the application (including a file name and line number(s)), a host name where the application resides, a domain name associated with the application, and a pathname to the application;
utilizing the set of characteristics associated with the vulnerability with uncertain importance, determine, by scoring logic in the vulnerability importance identification mechanism, a level of importance for the vulnerability with uncertain importance; and
assign, by importance identification logic in the vulnerability importance identification mechanism, the level of importance to the vulnerability with uncertain importance thereby forming an identified level of importance; and
with a respective identified level of importance assigned to each vulnerability with uncertain importance in the set of vulnerabilities with uncertain importance thereby forming a set of vulnerabilities with identified level of importance, present, by the vulnerability importance identification mechanism, the set of vulnerabilities with identified level of importance to a user so that the set of vulnerabilities with identified level of importance are addressed by the user based on the respective identified level of importance.

8. The computer program product of claim 7, wherein the computer readable program to determine the level of importance for the vulnerability with uncertain importance further causes the computing device to:
for each vulnerability with uncertain importance of the set of vulnerabilities with uncertain importance:
compare by comparison logic in the vulnerability importance identification mechanism, the set of characteristics for the vulnerability with uncertain importance to a set of characteristics of other vulnerabilities that have an identified level of importance;
responsive to the set of characteristics associated with the vulnerability with uncertain importance being greater than or equal to a predetermined similarity threshold of the set of characteristics associated with a vulnerability with an identified level of importance, utilize, by the scoring logic, metric levels associated with vulnerability with the identified level of importance as metric levels for the vulnerability with uncertain importance; and
determine, by the scoring logic, the level of importance for the vulnerability with uncertain importance based on the metric levels for the vulnerability with uncertain importance.

9. The computer program product of claim 8, wherein the computer readable program further causes the computing device to:
for each vulnerability with uncertain importance of the set of vulnerabilities with uncertain importance:
responsive to the set of characteristics associated with the vulnerability with uncertain importance being less than the predetermined similarity threshold of the set of characteristics associated with a vulnerability with an identified level of importance, utilize, by the scoring logic, metric levels assigned by the user as the metric levels for the vulnerability with uncertain importance.

10. The computer program product of claim 8, wherein the metrics include "Access Complexity," "Authentication," "Confidentiality Impact," "Integrity Impact," "Availability Impact," "Exploitability," "Remediation Level," and "Report Confidence."

11. The computer program product of claim 7, wherein the computer readable program to determine the level of importance for the vulnerability with uncertain importance further causes the computing device to:
sort, by the scanning logic the set of vulnerabilities with uncertain importance based on the set of characteristics associated with each vulnerability with uncertain importance;
present, by the scanning logic, a sorted set of vulnerabilities with uncertain importance to the user; and
for each vulnerability with uncertain importance of the set of vulnerabilities with uncertain importance:
utilize, by the scoring logic, metric levels assigned by the user as the metric levels for the vulnerability with uncertain importance; and
determine by the scoring logic, the level of importance for the vulnerability with uncertain importance based on the metric levels for the vulnerability with uncertain importance.

12. The computer program product of claim 7, wherein the computer readable program to assign the level of importance to the vulnerability with uncertain importance further causes the computing device to:
recalculate, by the scoring logic, the level of importance for the vulnerability with uncertain importance based on a level of importance assigned to a vulnerability with identified level of importance.

13. An apparatus comprising:
a processor; and
a memory coupled to the processor, wherein the memory comprises instructions which, when executed by the processor, cause the processor to implement a vulnerability importance identification mechanism for automatically determining an importance of vulnerabilities identified in an application, and further cause the processor to:
scan, by scanning logic in the vulnerability importance identification mechanism, an identified application for a set of vulnerabilities with uncertain importance, wherein each vulnerability with uncertain importance in the set of vulnerabilities with uncertain importance fails to have an associated importance;
for each vulnerability with uncertain importance in the set of vulnerabilities with uncertain importance:
identify, by the scanning logic, a set of characteristics, wherein the set of characteristics includes a location of the vulnerability with uncertain importance within source code of the application (including a file name and line number(s)), a host name where the application resides, a domain name associated with the application, and a pathname to the application;
utilizing the set of characteristics associated with the vulnerability with uncertain importance, determine, by scoring logic in the vulnerability importance identification mechanism, a level of importance for the vulnerability with uncertain importance; and
assign, by importance identification logic in the vulnerability importance identification mechanism, the level of importance to the vulnerability with uncertain importance thereby forming an identified level of importance; and
with a respective identified level of importance assigned to each vulnerability with uncertain importance in the set of vulnerabilities with uncertain importance thereby forming a set of vulnerabilities with identified level of importance, present, by the vulnerability importance identification mechanism, the set of vulnerabilities with identified level of importance to a user so that the set of vulnerabilities with identified level of importance are addressed by the user based on the respective identified level of importance.

14. The apparatus of claim 13, wherein the instructions to determine the level of importance for the vulnerability with uncertain importance further cause the processor to:
for each vulnerability with uncertain importance of the set of vulnerabilities with uncertain importance:
compare by comparison logic in the vulnerability importance identification mechanism, the set of characteristics for the vulnerability with uncertain importance to a set of characteristics of other vulnerabilities that have an identified level of importance;
responsive to the set of characteristics associated with the vulnerability with uncertain importance being greater than or equal to a predetermined similarity threshold of the set of characteristics associated with a vulnerability with an identified level of importance, utilize, by the scoring logic, metric levels associated with vulnerability with the identified level of importance as metric levels for the vulnerability with uncertain importance; and
determine, by the scoring logic, the level of importance for the vulnerability with uncertain importance based on the metric levels for the vulnerability with uncertain importance.

15. The apparatus of claim 14, wherein the instructions further cause the processor to:
for each vulnerability with uncertain importance of the set of vulnerabilities with uncertain importance:
responsive to the set of characteristics associated with the vulnerability with uncertain importance being less than the predetermined similarity threshold of the set of characteristics associated with a vulnerability with an identified level of importance, utilize, by the scoring logic, metric levels assigned by the user as the metric levels for the vulnerability with uncertain importance.

16. The apparatus of claim 14, wherein the metrics include "Access Complexity," "Authentication," "Confidentiality Impact," "Integrity impact," "Availability Impact," "Exploitability," "Remediation Level," and "Report Confidence."

17. The apparatus of claim 13, wherein the instructions to determine the level of importance for the vulnerability with uncertain importance further cause the processor to:
sort, by the scanning logic the set of vulnerabilities with uncertain importance based on the set of characteristics associated with each vulnerability with uncertain importance;
present, by the scanning logic, a sorted set of vulnerabilities with uncertain importance to the user; and
for each vulnerability with uncertain importance of the set of vulnerabilities with uncertain importance:
utilize, by the scoring logic, metric levels assigned by the user as the metric levels for the vulnerability with uncertain importance; and
determine by the scoring logic, the level of importance for the vulnerability with uncertain importance based on the metric levels for the vulnerability with uncertain importance.

18. The apparatus of claim 13, wherein the instructions to assign the level of importance to the vulnerability with uncertain importance further cause the processor to:
recalculate, by the scoring logic, the level of importance for the vulnerability with uncertain importance based on a level of importance assigned to a vulnerability with identified level of importance.

* * * * *